United States Patent
Huang et al.

(10) Patent No.: US 10,519,595 B2
(45) Date of Patent: Dec. 31, 2019

(54) COMPOSITE TEXTILE

(71) Applicant: INDUSTRIAL TECHNOLOGY RESEARCH INSTITUTE, Hsinchu (TW)

(72) Inventors: Yung-Pin Huang, New Taipei (TW); Chun-Min Lee, Hsinchu (TW); Pei-Yi Yeh, Hemei Township (TW); Yi-Chun Kuo, Zhubei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 92 days.

(21) Appl. No.: 15/858,023

(22) Filed: Dec. 29, 2017

(65) Prior Publication Data

US 2019/0203410 A1 Jul. 4, 2019

(51) Int. Cl.
*D06M 11/36* (2006.01)
*D06M 15/356* (2006.01)
(Continued)

(52) U.S. Cl.
CPC ........ *D06M 15/3562* (2013.01); *D06M 11/36* (2013.01); *D06M 23/08* (2013.01); *D06M 15/256* (2013.01); *D06M 15/507* (2013.01); *D06M 15/564* (2013.01); *D06M 15/59* (2013.01); *D10B 2201/20* (2013.01);
(Continued)

(58) Field of Classification Search
USPC ......... 442/131, 133; 977/773, 775, 777–779, 977/783, 784
See application file for complete search history.

(56) References Cited

U.S. PATENT DOCUMENTS 2,961,349 A 11/1960 Bartl et al.
5,589,274 A 12/1996 Long et al.
(Continued)

FOREIGN PATENT DOCUMENTS

CN 1417021 A 5/2003
CN 101550657 A 10/2009
(Continued)

OTHER PUBLICATIONS

"Polyvinylpyrrolidone," Sigma-Aldrich, https://www.signnaaldrich.com/catalog/product/sial/pvp40?lang=en&region=US&gclid=Cj0KCQjwuLPnBRDjARIsACDzGL02TfRSXdmsXUjUWEC_eCaHn5A7IpvstUeteVcCsUQHHB5-JQZDafwaAneJEALw_wcB accessed May 28, 2019. (Year: 2019).*
(Continued)

*Primary Examiner* — Matthew D Matzek
(74) *Attorney, Agent, or Firm* — Birch, Stewart, Kolasch & Birch, LLP

(57) ABSTRACT

A composite textile is provided. The composite textile includes a textile substrate and a thermal material layer formed on the textile substrate. The thermal material layer includes a nanocomposite powder. The nanocomposite powder is composed of a pyrrolidone-containing polymer and an inorganic particle. The pyrrolidone-containing polymer is polyvinylpyrrolidone, a derivative of polyvinylpyrrolidone or a combination thereof. The inorganic particle is a metal oxide composed of a first metal $M^A$, a doping metal $M^B$ and oxygen. The inorganic particle makes up 62.5-99.9 wt. % of the nanocomposite powder.

14 Claims, 1 Drawing Sheet

(51) Int. Cl.
*D06M 23/08* (2006.01)
*D06M 15/256* (2006.01)
*D06M 15/507* (2006.01)
*D06M 15/564* (2006.01)
*D06M 15/59* (2006.01)

(52) U.S. Cl.
CPC .... *D10B 2211/00* (2013.01); *D10B 2321/021* (2013.01); *D10B 2321/022* (2013.01); *D10B 2331/02* (2013.01); *D10B 2331/04* (2013.01); *D10B 2401/04* (2013.01)

(56) References Cited

U.S. PATENT DOCUMENTS

| | | | |
|---|---|---|---|
| 5,611,852 | A | 3/1997 | Pfaff et al. |
| 5,876,856 | A | 3/1999 | Long |
| 6,176,453 | B1 | 1/2001 | Long et al. |
| 7,438,836 | B2 | 10/2008 | Michael et al. |
| 7,651,640 | B2 | 1/2010 | Fukatani et al. |
| 7,659,499 | B2 | 2/2010 | Maehara |
| 7,666,568 | B2 | 2/2010 | Gao et al. |
| 7,669,626 | B1 | 3/2010 | Mruk et al. |
| 8,163,342 | B2 | 4/2012 | Stricker et al. |
| 8,449,983 | B2 | 5/2013 | Ii et al. |
| 9,196,852 | B2 | 11/2015 | Cha et al. |
| 2003/0013369 | A1* | 1/2003 | Soane ............... D06M 16/00 442/181 |
| 2004/0063023 | A1 | 4/2004 | Rao et al. |
| 2004/0248487 | A1* | 12/2004 | Yasumitsu ........... C09D 5/32 442/131 |
| 2006/0110591 | A1 | 5/2006 | Kuroiwa et al. |
| 2007/0072501 | A1* | 3/2007 | Holcombe ............ F41H 3/02 442/76 |
| 2007/0206263 | A1 | 9/2007 | Neuman et al. |
| 2008/0057225 | A1 | 3/2008 | Stricker et al. |
| 2008/0173390 | A1 | 7/2008 | Narasimhan et al. |
| 2010/0292623 | A1 | 11/2010 | Greiner et al. |
| 2014/0296056 | A1 | 10/2014 | Nien et al. |
| 2017/0198430 | A1 | 7/2017 | Huang et al. |

FOREIGN PATENT DOCUMENTS

| | | |
|---|---|---|
| CN | 103450894 A | 12/2013 |
| CN | 104762711 A | 7/2015 |
| CN | 104947411 A | 9/2015 |
| CN | 105220461 A | 1/2016 |
| CN | 105734953 A | 7/2016 |
| GB | 1019129 A | 2/1966 |
| JP | 1-132816 A | 5/1989 |
| JP | 1-314716 A | 12/1989 |
| JP | 3695604 B2 | 9/2005 |
| JP | 2006-132042 A | 5/2006 |
| TW | 422898 B | 2/2001 |
| TW | 200902073 A | 1/2009 |
| TW | I341879 A | 5/2011 |
| TW | 201202498 A1 | 1/2012 |
| TW | I418676 B | 12/2013 |
| TW | 201437443 A | 10/2014 |
| TW | 201525212 A | 7/2015 |
| TW | I555890 B | 11/2016 |
| WO | WO 01/85827 A2 | 11/2001 |
| WO | WO 03/035964 A1 | 5/2003 |
| WO | WO 2006/008785 A1 | 1/2006 |

OTHER PUBLICATIONS

Allah et al., "Characterisation of porous doped ZnO thin films deposited by spray pyrolysis technique," Applied Surface Science, vol. 253, 2007 (Available online Jun. 2, 2007), pp. 9241-9247.

Kim et al., "High work function of Al-doped zinc-oxide thin films as transparent conductive anodes in organic light-emitting devices," Applied Surface Science, vol. 253, 2006 (Available online May 5, 2006), pp. 1917-1920.

Li et al., "Dispersion of aluminum-doped zinc oxide nanopowder in non-aqueous suspensions," Journal of the American Ceramic Society, 2017, pp. 1-10.

Park et al., "Effects of substrate temperature on the properties of Ga-doped ZnO by pulsed laser deposition," Thin Solid Films, vol. 513, 2006 (Available online Feb. 14, 2006), pp. 90-94.

Pasquarelli et al., "Solution processing of transparent conductors: from flask to film," Chemical Society Reviews, vol. 40, 2011 (Published on Jun. 17, 2011), pp. 5406-5441.

Taiwanese Office Action and Search Report for Taiwanese Application No. 106146490, dated Sep. 28, 2018.

Chinese Office Action and Search Report for Chinese Application. No. 201611060701.X, dated Jun. 27, 2018.

Taiwan Office Action for Appl. No. 105139051 dated Mar. 22, 2018.

U.S. Office Action, dated Jan. 9, 2019, for U.S. Appl. No. 15/362,119.

U.S. Office Action, dated Jul. 25, 2019, for U.S. Appl. No. 15/362,119.

\* cited by examiner

COMPOSITE TEXTILE

TECHNICAL FIELD

The present disclosure relates to a composite textile, and in particular it relates to a composite textile capable of efficiently absorbing infrared rays and thereby generating heat.

BACKGROUND

There are several possible ways to achieve better thermal effects with general textiles. For example, the density or thickness of the textile may be increased. However, the resulting textiles may have problems of poor air permeability and heavy weight, which may cause discomfort to the user.

Furthermore, fillers (such as animal feathers) may be added to the final product of the textile (such as apparel) to improve the thermal effect of the final product. However, such fillers may cause inconvenience to the user due to the substantial increase in the volume of the final product.

Therefore, there is still a demand in the art to find a textile with light weight, thinness, and excellent thermal retention.

SUMMARY

One embodiment of the disclosure discloses a composite textile including a textile substrate and a thermal material layer formed on the textile substrate. The thermal material layer includes nanocomposite powder. The nanocomposite powder consists of a pyrrolidone-containing polymer and an inorganic particle. The pyrrolidone-containing polymer is a polyvinylpyrrolidone, a derivative of polyvinylpyrrolidone, or a combination thereof. The inorganic particle is a metal oxide composed of a first metal $M^A$, a doping metal $M^B$ and oxygen. The inorganic particle makes up 62.5-99.9 wt. % of the nanocomposite powder.

A detailed description is given in the following embodiments with reference to the accompanying drawings.

BRIEF DESCRIPTION OF DRAWINGS

The present disclosure can be more fully understood by reading the subsequent detailed description and examples with references made to the accompanying drawings, wherein.

DETAILED DESCRIPTION

The present disclosure is best understood from the following detailed description when read with the accompanying figures. It should be noted that, in accordance with the standard practice in the industry, various features are not drawn to scale. In fact, the relative dimensions of the various features may be arbitrarily increased or reduced for clarity of discussion.

In the disclosure, the term "about" or "approximately" means in a range of 20% of a given value or range, preferably 10%, and more preferably 5%. In the disclosure, if there is no specific explanation, a given value or range means an approximate value which may imply the meaning of "about" or "approximately".

In accordance with some embodiments of the disclosure, a composite textile is provided. The composite textile includes a textile substrate and a thermal material layer formed on the textile substrate. The thermal material layer includes nanocomposite powder. The nanocomposite powder is composed of a pyrrolidone-containing polymer and inorganic particles. The pyrrolidone-containing polymer is a polyvinylpyrrolidone, a derivative of polyvinylpyrrolidone, or a combination thereof. The inorganic particle is a metal oxide composed of a first metal $M^A$, a doping metal $M^B$ and oxygen. The inorganic particle makes up 62.5-99.9 wt. % of the nanocomposite powder.

The above-mentioned nanocomposite powder can efficiently absorb the energy of light such as infrared rays, and it can release the absorbed energy in the form of thermal energy after absorbing the energy of light. By forming a layer of thermal material including the nanocomposite powder on a textile substrate, the thermal effect of the textile can be significantly improved without increasing the volume or weight of the textile remarkably.

Figure 1:
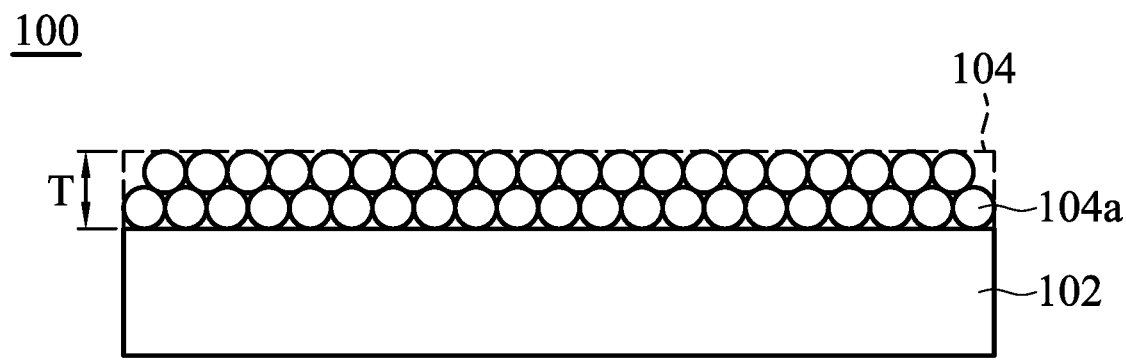
FIG. 1 shows a cross-sectional view of a composite textile in accordance with some embodiments of the disclosure.

FIG. 1 shows a cross-sectional view of a composite textile 100 in accordance with some embodiments of the disclosure. Referring to FIG. 1, in some embodiments, the composite textile 100 includes a textile substrate 102 and a thermal material layer 104 formed on the textile substrate 102. In other embodiments, the thermal material layer 104 may be a thin film made of the nanocomposite powder 104a, and in such embodiments, the thermal material layer 104 is shown by the dotted line in FIG. 1.

In some embodiments, the textile substrate 102 may include a polyethylene fiber textile, a polypropylene fiber textile, a polyamide fiber textile, a polyester fiber textile, a cellulose fiber textile, an acetate fiber textile, an animal fiber textile, or a combination thereof. However, these materials are merely exemplary materials and are not intended to be limiting. In other embodiments, the textile substrate 102 may be any other suitable textile.

The nanocomposite powder 104a may be composed of inorganic particles and a pyrrolidone-containing polymer. The nanocomposite powder 104a can efficiently absorb the energy of light such as infrared rays and can release the absorbed energy in the form of thermal energy after absorbing the energy of light. The released thermal energy of the nanocomposite powder 104a can be conducted to the textile substrate 102 so that the temperature of the final product of the composite textile 100 can be increased. As a result, the thermal effect of the final product can be significantly improved.

The inorganic particles can absorb the energy of light and can release thermal energy so that the thermal effect of the textile is improved. In some embodiments, the inorganic particle may be a metal oxide composed of a first metal $M^A$, a doping metal $M^B$ and oxygen, and the metal oxide may be represented by formula (I):

$$(M^A)(M^B)O \qquad (I)$$

In formula (I), the first metal $M^A$ is zinc, indium, or tin, and the doping metal $M^B$ is tin, aluminum, gallium, iron, or antimony.

The inorganic particles are formed by doping an oxide of a single metal (such as the first metal $M^A$) with another different metal (such as the doping metal $M^B$). In other words, in the oxide of the first metal $M^A$, some of the first metal $M^A$ is replaced by the doping metal $M^B$. As a result, the energy level of the oxide of the first metal $M^A$ may be changed. When the inorganic particles are irradiated by the light having a specific wavelength, the energy of the light is converted into kinetic energy of free carriers in the inorganic particles. These free carriers collide in the lattice of the inorganic particles and release thermal energy. For example, in some embodiments, the inorganic particles may be gallium-doped zinc oxide, aluminum-doped zinc oxide, tin-doped zinc oxide, gallium-doped indium oxide, or tin-doped indium oxide. However, these materials are merely exemplary materials and are not intended to be limiting. In other embodiments, the inorganic particles may be any of the inorganic particles represented by the above-mentioned-formula (I).

If the content of the doping metal $M^B$ in the inorganic particles is too small, the concentration of the free carriers is too low. As a result, the inorganic particles may not be able to effectively absorb light energy and release thermal energy. On the contrary, if the content of the doping metal $M^B$ in the inorganic particles is too much, the light energy cannot be efficiently absorbed and the thermal energy cannot be efficiently released. Therefore, the content of the doping metal $M^B$ in the inorganic particles may be adjusted within a specific range so that the inorganic particles can efficiently absorb the light energy and release the thermal energy. In some embodiments, the doping metal $M^B$ is 0.1-20 parts by weight, based on 100 parts by weight of the first metal $M^A$ in the inorganic particle. In other embodiments, the doping metal $M^B$ is 1-15 parts by weight, based on 100 parts by weight of the first metal $M^A$ in the inorganic particle. In still other embodiments, the doping metal $M^B$ is 5-10 parts by weight, based on 100 parts by weight of the first metal $M^A$ in the inorganic particle.

In some embodiments, the method for preparing the inorganic particles may include the following steps.

Step 1: the nitrate or sulfate of the first metal $M^A$ and the chloride or sulfate of the doping metal $M^B$ were mixed and dissolved in water to obtain a mixed salt solution. In this mixed salt solution, the total concentration of the first metal $M^A$ and the doping metal $M^B$ was ranging from 0.5 ml/L to 5.0 ml/L. Furthermore, in this mixed salt solution, the content of the doping metal $M^B$ was 0.1-20 parts by weight, based on 100 parts by weight of the first metal $M^A$ in the inorganic particle.

Step 2: the mixed salt solution obtained in step 1 and the ammonium bicarbonate solution were respectively added dropwise to water and stirred rapidly to produce a white precipitate. In step 2, the temperature was maintained at 40° C. and the pH value was controlled at 7.0-7.5. This white precipitate was the basic carbonate of the first metal $M^A$ uniformly doped with the doping metal $M^B$.

Step 3: the obtained white precipitate was separated by washing and dried to obtain a white powder. The resulting white powder was sintered under the condition of mixing with hydrogen and argon. The sintering temperature was controlled at 400° C.-700° C., and the sintering time was controlled within 30-60 minutes. The powder obtained after sintering was the inorganic particles of the first metal $M^A$ doped with the doping metal $M^B$.

The pyrrolidone-containing polymer and the inorganic particles may form a complex (i.e., nanocomposite powder 104a). If there is no pyrrolidone-containing polymer, the inorganic particles may aggregate easily, thereby resulting in increase in particle diameter of the inorganic particles and decrease in surface area of the inorganic particles. As a result, the efficiency of absorbing light energy and releasing thermal energy may be reduced. Therefore, the event of aggregation of the inorganic particles can be avoided by combining the pyrrolidone-containing polymer with the inorganic particles to form the nanocomposite powder 104a, so that the problems of decrease in efficiency of absorbing light energy and releasing thermal energy can be improved.

In some embodiments, the pyrrolidone-containing polymer may be a polyvinylpyrrolidone (PVP), a derivative of polyvinylpyrrolidone, or a combination thereof. In some embodiments, the derivative of polyvinylpyrrolidone includes a polyvinylpyrrolidone having an isocyanate group at a terminal, a polyvinylpyrrolidone having a methoxy group at a terminal, a polyvinylpyrrolidone having an ethoxy group at a terminal, a polyvinylpyrrolidone having a carboxylic acid group at a terminal, or a combination thereof. However, these materials are merely exemplary materials and are not intended to be limiting. In other embodiments, the pyrrolidone-containing polymer may be any other suitable pyrrolidone-containing polymer.

If the content of the inorganic particles in the nanocomposite powder 104a is too small, the efficiency of absorbing light energy and releasing thermal energy may be reduced. On the contrary, if the content of the inorganic particles in the nanocomposite powder 104a is too much, the inorganic particles may aggregate easily, thereby resulting in increase in particle diameter of the nanocomposite powder 104a and decrease in surface area of the nanocomposite powder 104a. As a result, the efficiency of absorbing light energy and releasing thermal energy may also be reduced. Therefore, the content of the inorganic particles in the nanocomposite powder 104a may be adjusted within a specific range so that the efficiency of absorbing light energy and releasing thermal energy may not be affected. In some embodiments, the inorganic particle makes up 62.5-99.9 wt. % of the nanocomposite powder. In other embodiments, the inorganic particle makes up 70.0-90.0 wt. % of the nanocomposite powder. In still other embodiments, the inorganic particle makes up 75.0-85.0 wt. % of the nanocomposite powder.

In some embodiments, the weight average molecular weight (Mw) of the pyrrolidone-containing polymer is 3,000-1,500,000. In other embodiments, the weight average molecular weight of the pyrrolidone-containing polymer is 30,000-1,100,000. In still other embodiments, the weight average molecular weight of the pyrrolidone-containing polymer is 300,000-700,000.

The method of preparing the nanocomposite powder 104a may be any suitable method. For example, in some embodiments, the inorganic particles, the pyrrolidone-containing polymer, and the solvent may be mixed to form a colloid mixture. Then, the colloid mixture is dried by removing the solvent to obtain the nanocomposite powder 104a.

In order to obtain a colloid mixture, the solubility in the solvent of the pyrrolidone-containing polymer should be good. Furthermore, in order to efficiently remove the solvent from the colloid mixture, the boiling point of the solvent should be lower. Under the above-mentioned conditions, in some embodiments, suitable solvents may include dimethylacetamide (DMAc) or dimethyl sulfoxide (DMSO). However, these solvents are merely exemplary solvents and are not intended to be limiting. In other embodiments, the solvent may be any other suitable solvent.

In some embodiments, the method for drying the colloid mixture may include spray dry or reduced pressure distillation. However, these methods are merely exemplary methods and are not intended to be limiting. In other embodiments, the method may be any other suitable methods.

In some embodiments, the above-mentioned colloid mixture may be coated on the textile substrate 102 directly. Then, the colloid mixture may be dried to obtain the composite textile 100. As shown in FIG. 1, the resulting composite textile 100 may have the textile substrate 102 and the thermal material layer 104 formed on the textile substrate 102. In such embodiments, the composite textile 100 can be efficiently manufactured by simple processes. Therefore, the time and cost of the production can be significantly reduced.

The colloid mixture may be coated on the textile substrate 102 by a suitable coating process. In some embodiments, the coating process may include a gravure printing process, a screen-printing, a roll coating process, a spray coating process, a blade coating process, other suitable deposition processes, or a combination thereof.

After the colloid mixture has been formed, if the colloid mixture is allowed to stand for a period of time (for example, 24 hours), the nanocomposite powder 104a in the colloid mixture may gradually aggregate and precipitate, thereby resulting in increase in particle diameter of the nanocomposite powder 104a. As a result, the efficiency of absorbing light energy and releasing thermal energy may be reduced.

In other embodiments, the above-mentioned colloid mixture (hereinafter also referred to as "the first colloid mixture") may be dried to obtain the dried nanocomposite powder 104a. After that, the dried nanocomposite powder 104a is optionally dissolved in a suitable solvent to re-form a colloid mixture (hereinafter also referred to as "the second colloid mixture"). Then, the second colloid mixture is coated on the textile substrate 102 and dried to obtain the composite textile 100. In such embodiments, the dried nanocomposite powder 104a has the advantage of small size and stable physical and chemical properties. Therefore, the dried nanocomposite powder 104a does not have to be used immediately, and may be stored for a long period of time (for example, from several days to several months) under appropriate storage conditions to be more in line with the operational requirements. As a result, the flexibility of the manufacturing processes can be significantly improved.

The particle diameter of the nanocomposite powder 104a may substantially be equal to the particle diameter of the colloid in the colloid mixture. For example, after the first colloid mixture is dried, the particle diameter of the obtained nanocomposite powder 104a may substantially be equal to the particle diameter of the colloid in the first colloid mixture. In other embodiments, after the second colloid mixture is dried, the particle diameter of the obtained nanocomposite powder 104a may substantially be equal to the particle diameter of the colloid in the second colloid mixture. Therefore, the particle diameter of the nanocomposite powder 104a can be obtained by measuring the particle diameter of the colloid in the colloid mixture.

If the particle diameter of the nanocomposite powder 104a is too large, the surface area of the nanocomposite powder 104a may be reduced. As a result, the efficiency of absorbing light energy and releasing thermal energy may be reduced. On the other hand, in order to prepare the nanocomposite powder 104a having the smaller particle diameter, it may take more time and cost. Therefore, the median particle diameter D50 of the nanocomposite powder 104a may be adjusted within a specific range. In some embodiments, the median particle diameter D50 of the nanocomposite powder 104a is 30-600 nm. In other embodiments, the median particle diameter D50 of the nanocomposite powder 104a is 35-200 nm. In still other embodiments, the median particle diameter D50 of the nanocomposite powder 104a is 40-100 nm.

Still referring to FIG. 1, the thickness of the thermal material layer 104 is T. If the thickness T of the thermal material layer 104 is too small, the efficiency of absorbing light energy and releasing thermal energy may be reduced. On the contrary, if the thickness T of the thermal material layer 104 is too large, some nanocomposite powder 104a may peel off, and the yield of the final product may be reduced. Furthermore, if the thickness T of the thermal material layer 104 is too large, the air permeability of the composite textile 100 may be reduced, which may cause discomfort to the user. Therefore, the thickness T of the thermal material layer 104 may be adjusted within a specific range. In some embodiments, the thickness T of the thermal material layer 104 is 1-100 μm. In other embodiments, the thickness T of the thermal material layer 104 is 5-80 μm. In still other embodiments, the thickness T of the thermal material layer 104 is 10-50 μm. The thickness of the thermal material layer 104 can be measured by using the TECLOCK thickness gauge (for example, manufacturer: Nippon-TECLOCK; Product Model: SM-112).

Similarly, if the amount of nanocomposite powder 104a is too small, the efficiency of absorbing light energy and releasing thermal energy may be reduced. On the contrary, if the amount of the nanocomposite powder 104a is too large, some of the nanocomposite powder 104a may peel off, and the yield of the final product may be reduced. Therefore, the amount of the nanocomposite powder 104a may be adjusted within a specific range. In some embodiments, the nanocomposite powder 104a is 0.0001-600 parts by weight, based on 100 parts by weight of the textile substrate 102. In other embodiments, the nanocomposite powder 104a is 0.01-100 parts by weight, based on 100 parts by weight of the textile substrate 102. In other embodiments, the nanocomposite powder 104a is 0.1-50 parts by weight, based on 100 parts by weight of the textile substrate 102. In still other embodiments, the nanocomposite powder 104a is 1-10 parts by weight, based on 100 parts by weight of the textile substrate 102.

In order to make the color of the composite textile 100 be the same as or similar to the color of the textile substrate 102, the thermal material layer 104 may be a highly transparent thin film. In other words, for the visible light having a wavelength in the range of 400-700 nm, the light transmittance of the thermal material layer 104 may be as high as possible. In some embodiments, the light transmittance of the thermal material layer 104 is 70-83% under the conditions in which the wavelength is in the range of 400-700 nm and the thickness T of the thermal material layer 104 is 6 μm. In some embodiments, the light transmittance of the thermal material layer 104 for the visible light can be measured by using an infrared rays/visible light absorption spectrometer (for example, UV/VIS/NIR spectrometer; manufacturer: JASCO INTERNATIONAL CO., LTD.; Product Model: JASCO-V570). Further, the value of the light transmittance of the thermal material layer 104 depends on the thickness T of the thermal material layer 104. Therefore, when the thickness T of the thermal material layer 104 is not 6 μm, the light transmittance of the thermal material layer 104 can be calculated from the thickness T. For example, assuming that the light transmittance of a certain thermal material layer 104 with a thickness of X μm is Y and when the thickness of this thermal material layer 104 is 6 μm, the light transmittance can be calculated by the following equation:

$$\text{Light transmittance} = 1 - \{[6(1-Y)]/X\}.$$

In order to significantly improve the thermal ability of the composite textile 100, the thermal material layer 104 may be a thin film having a high infrared absorption capability. In other words, the infrared absorption capability of the thermal material layer 104 may be as high as possible. More specifically, for the infrared rays having a wavelength in the range of 1,000-2,500 nm, the light transmittance of the thermal material layer 104 may be as high as possible. In some embodiments, the light absorption of the thermal material layer 104 is 70-83% under the conditions in which the wavelength is in the range of 1,000-2,500 nm and the thickness T of the thermal material layer 104 is 6 μm. In some embodiments, the light absorption of the thermal material layer 104 for the infrared rays can be measured by using an infrared rays/visible light absorption spectrometer (for example, UV/VIS/NIR spectrometer; manufacturer: JASCO INTERNATIONAL CO., LTD.; Product Model: JASCO-V570). Further, the value of the light absorption of the thermal material layer 104 depends on the thickness T of the thermal material layer 104. Therefore, when the thickness T of the thermal material layer 104 is not 6 μm, the light absorption of the thermal material layer 104 can be calculated from the thickness T. For example, assuming that the light absorption of a certain thermal material layer 104 with a thickness of A μm is B and when the thickness of this thermal material layer 104 is 6 μm, the light absorption can be calculated by the following equation:

Light absorption=$(6 \times B/A)$.

Figure 2:
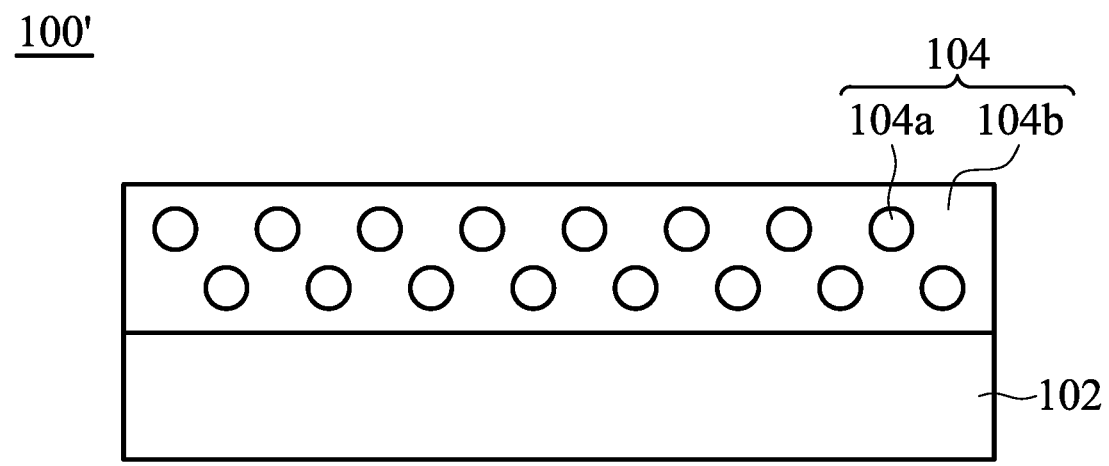
FIG. 2 shows a cross-sectional view of a composite textile in accordance with other embodiments of the disclosure.

FIG. 2 shows a cross-sectional view of a composite textile 100' in accordance with other embodiments of the disclosure. Referring to FIG. 2, the composite textile 100' includes a textile substrate 102 and a thermal material layer 104 formed on the textile substrate 102. FIG. 2 is similar to FIG. 1, except that the thermal material layer 104 includes the nanocomposite powder 104a and a polymer carrier 104b. The same elements in FIG. 2 as those in FIG. 1 are denoted by the same reference numerals. For the sake of simplicity of explanation, the elements and the manufacturing process thereof which are the same as or similar to those in FIG. 1 are not repeated here.

If the adhesion between the nanocomposite powder 104a and the textile substrate 102 is insufficient, some of the nanocomposite powder 104a may peel from the textile substrate 102. In some embodiments, the thermal material layer 104 is a thin film made of the nanocomposite powder 104a and the polymer carrier 104b, as shown in FIG. 2. In such embodiments, the polymer carrier 104b can function as an adhesive and can further enhance the adhesion between the nanocomposite powder 104a and the textile substrate 102. Therefore, the problem of peeling of the nanocomposite powder 104a can be improved or avoided.

In order to avoid the problem of peeling of the nanocomposite powder 104a, the adhesion of the polymer carrier 104b to the textile substrate 102 may be better than the adhesion of the nanocomposite powder 104a to the textile substrate 102. Furthermore, if the compatibility between the polymer carrier 104b and the nanocomposite powder 104a is poor, the polymer carrier 104b and the nanocomposite powder 104a may delaminate. That is, the nanocomposite powder 104a may be concentrated on the top or the bottom of the polymer carrier 104b instead of being uniformly dispersed in the polymer carrier 104b. When the polymer carrier 104b and the nanocomposite powder 104a delaminate, the adhesion between the nanocomposite powder 104a and the textile substrate 102 cannot be effectively enhanced. As a result, the problem of peeling of the nanocomposite powder 104a cannot be avoided. Therefore, a material having good adhesion to the textile substrate 102 and good compatibility with the nanocomposite powder 104a may be selected as the polymer carrier 104b.

In some embodiments, the polymer carrier 104b may include a polyurethane, a polyacrylonitrile, a polyvinylidene fluoride, a polyacrylate, a polypropylene, a polyamide, a polyester, a thermoplastic polyester elastomer, or a combination thereof. However, these materials are merely exemplary materials and are not intended to be limiting. In other embodiments, the polymer carrier 104b may be any other suitable polymer. By adding the polymer carrier 104b, the thermal material layer 104 including the nanocomposite powder 104a and the polymer carrier 104b can be prepared by a spinning process. As a result, the film formability of the nanocomposite powder 104a can be significantly improved.

The method for preparing the composite textile 100' shown in FIG. 2 may be any suitable method. For example, in some embodiments, the inorganic particles, the pyrrolidone-containing polymer, and the solvent may be mixed to form a colloid mixture. Then, this colloid mixture is added to the polymer carrier 104b, and a non-woven fabric thin film is formed by electrospinning. Then, the non-woven fabric thin film is attached to the textile substrate 102 to obtain the composite textile 100'. As described above, in such embodiments, the time and cost of the production can be significantly reduced.

In other embodiments, the dried nanocomposite powder 104a may be dissolved in a suitable solvent to form a colloid mixture. Then, this colloid mixture is added to the polymer carrier 104b, and a non-woven fabric thin film is formed by electrospinning. Then, the non-woven fabric thin film is attached to the textile substrate 102 to obtain the composite textile 100'. As described above, in such embodiments, the flexibility of the manufacturing processes can be significantly improved.

If the ratio of the polymer carrier 104b to the nanocomposite powder 104a is too low, the adhesion between the nanocomposite powder 104a and the textile substrate 102 cannot be enhanced. Furthermore, if the ratio of the polymer carrier 104b to the nanocomposite powder 104a is too low, the surface roughness of the thermal material layer 104 may be increased, but the surface tension and mechanical strength of the thermal material layer 104 may be attenuated. As a result, the thermal material layer 104 may be damaged or peeled off. On the contrary, if the ratio of the polymer carrier 104b to the nanocomposite powder 104a is too high, the efficiency of absorbing light energy and releasing thermal energy may be reduced. Therefore, the ratio of the polymer carrier 104b to the nanocomposite powder 104a may be adjusted within a specific range. In some embodiments, the polymer carrier 104b is 0.1-60 parts by weight, based on 100 parts by weight of the nanocomposite powder in the thermal material layer 104. In other embodiments, the polymer carrier 104b is 1-40 parts by weight, based on 100 parts by weight of the nanocomposite powder in the thermal material layer 104. In other embodiments, the polymer carrier 104b is 5-20 parts by weight, based on 100 parts by weight of the nanocomposite powder in the thermal material layer 104.

In the following, a few examples are given to illustrate the composite textile and the method for manufacturing the composite textile of the present disclosure.

In this specification, the preparation method of inorganic particles will be described by taking gallium-doped zinc oxide (hereinafter also referred to as "GZO") and aluminum-doped zinc oxide (hereinafter also referred to as "AZO") as exemplary examples.

[Preparation Example 1] Preparation of GZO
(Weight Ratio: Ga/Zn=5.0/100.0)

10 g of zinc nitrate and 0.33 g of gallium chloride were mixed and dissolved in water to obtain a mixed salt solution.

Then, 50 ml of the mixed salt solution and 50 ml of ammonium bicarbonate solution were respectively dropwise to water and stirred rapidly to produce a white precipitate. During this step, the temperature was maintained at 40° C. and the pH value was controlled at 7.0-7.5. Then, the white precipitate was separated by washing and dried to obtain a white powder. The resulting white powder was sintered under the condition of mixing with hydrogen and argon (the partial pressure of hydrogen was the same as the partial pressure of argon). The sintering temperature was controlled at 50° C., and the sintering time was controlled within 60 minutes. The powder obtained after sintering is GZO inorganic particles (weight ratio: Ga/Zn=5.0/100.0).

[Preparation Example 2] Preparation of AZO (Weight Ratio: Al/Zn=0.4/100.0)

10 g of zinc nitrate and 0.7 g of aluminum chloride were mixed and dissolved in water to obtain a mixed salt solution. Except for the above-mentioned reactants, the same procedure as in Preparation Example 1 was carried out to prepare AZO inorganic particles (weight ratio: Al/Zn=0.4/100.0).

[Example 1-1] Preparation of the GZO/PVP Nanocomposite Powder 100 g of GZO (weight ratio: Ga/Zn=5.0/100.0), 5 g of polyvinylpyrrolidone (PVP; Mw=58,000), and 400 g of dimethylacetamide (DMAc) were mixed and stirred uniformly to form a first colloid mixture. The first median particle diameter D50 of the colloid was measured. The stability of the colloid mixture was observed at room temperature, and the stable dispersion phenomenon was maintained for at least about 24 hours. The colloid mixture is spray-dried to obtain the GZO/PVP nanocomposite powder. After stored for 14 days, the resulting GZO/PVP nanocomposite powder was dissolved in dimethylacetamide to form a second colloid mixture. The second median diameter D50 of the colloid was measured.

[Example 1-2] Preparation of the GZO/PVP Nanocomposite Powder 100 g of GZO (weight ratio: Ga/Zn=5.0/100.0), 5 g of PVP (Mw=10,000), and 400 g of DMAc were mixed and stirred uniformly to form a first colloid mixture. The first median particle diameter D50 of the colloid was measured. The stability of the colloid mixture was observed at room temperature, and the stable dispersion phenomenon was maintained for at least about 24 hours. The colloid mixture is spray-dried to obtain the GZO/PVP nanocomposite powder. After stored for 14 days, the resulting GZO/PVP nanocomposite powder was dissolved in dimethylacetamide to form a second colloid mixture. The second median diameter D50 of the colloid was measured.

[Example 1-3] Preparation of the GZO/PVP Nanocomposite Powder 100 g of GZO (weight ratio: Ga/Zn=1.5/100.0), 5 g of PVP (Mw=1,280,000), and 400 g of DMAc were mixed and stirred uniformly to form a first colloid mixture. The first median particle diameter D50 of the colloid was measured. The stability of the colloid mixture was observed at room temperature, and the stable dispersion phenomenon was maintained for at least about 24 hours. The colloid mixture is spray-dried to obtain the GZO/PVP nanocomposite powder. After stored for 14 days, the resulting GZO/PVP nanocomposite powder was dissolved in dimethylacetamide to form a second colloid mixture. The second median diameter D50 of the colloid was measured.

[Comparative Example 1] Preparation of the GZO/PEI Nanocomposite Powder 100 g of GZO (weight ratio: Ga/Zn=1.5/100.0), 5 g of polyethylenimine (PEI; Mw=10,000), and 400 g of DMAc were mixed and stirred uniformly to form a first colloid mixture. The first median particle diameter D50 of the colloid was measured. The stability of the colloid mixture was observed at room temperature, and the stable dispersion phenomenon was maintained for about 6 hours only. After 6 hours, the precipitate was produced. In addition, because the PEI is a liquid polymer, the GZO/PEI nanocomposite powder cannot be obtained accordingly.

[Measurement of the Median Particle Diameter D50]

The particle diameter of the colloid was measured by using the Laser particle size analyzer (manufacturer: Malvern; Product Model: Zetasizer Nano ZS), and the particle size distribution diagram was drawn. The median particle diameter D50 was determined by the particle size distribution diagram.

TABLE 1

|  | Example 1-1 | Example 1-2 | Example 1-3 | Comparative Example 1 |
|---|---|---|---|---|
| first median particle diameter D50 | 80.3 nm | 125 nm | 62 nm | 199.5 nm |
| duration of stable dispersion | >24 h | >24 h | >24 h | <6 h |
| second median particle diameter D50 | 85 nm | 122 nm | 67 nm | nanocomposite powder cannot be obtained |

The experimental results of Examples 1-1, 1-2, 1-3 and Comparative Example 1 are shown in Table 1. Referring to Table 1, the colloid mixtures of Example 1-1, Example 1-2, and Example 1-3 can be stably dispersed for at least 24 hours. By contrast, the colloid mixture of Comparative Example 1 can only sustain the stable dispersion phenomenon for about 6 hours. Accordingly, it can be realized that in contrast to the pyrrolidone-free polymer, the stability of the colloid mixture including the pyrrolidone-containing polymer and the inorganic particles is better. Therefore, it is advantageous to preparation of the nanocomposite powder.

Furthermore, the first median particle diameters D50 of Example 1-1, Example 1-2, and Example 1-3 were smaller than the first median particle diameter D50 of Comparative Example 1. Accordingly, it can be realized that the efficiency of releasing thermal energy in Example 1-1, Example 1-2, and Example 1-3 were better than the efficiency of releasing thermal energy in Comparative Example 1.

The nanocomposite powder could be obtained in Example 1-1, Example 1-2, and Example 1-3. By contrast, the nanocomposite powder could not be obtained in Comparative Example 1. Furthermore, in each of Example 1-1, Example 1-2, and Example 1-3, the second median particle diameter D50 was very close to the first median particle diameter D50. Accordingly, it can be realized that in each of Example 1-1, Example 1-2, and Example 1-3, the properties of the nanocomposite powder did not significantly change even after a certain period of storage.

Example 2

200 g of AZO (weight ratio: Al/Zn=0.4/100.0), 6 g of PVP (Mw=58,000), and 800 g of dimethyl sulfoxide (DMSO) were mixed and stirred uniformly to form a colloid mixture. The measured median particle diameter D50 of the colloid was 102.8 nm. The colloid mixture was coated on a polyester fiber cloth by gravure printing and dried to obtain a composite textile. The AZO nanocomposite powder was measured to be 0.15 parts by weight with respect to 100 parts by weight of the textile substrate. Then, the infrared-induced temperature-rising test as specified in TN-037 and the infrared absorption test (wavelength for testing was 1,000-2,500 nm) were conducted on the composite textile.

Comparative Example 2

200 g of AZO was replaced by 200 g of ZnO. Except for the above-mentioned reactant, the procedure was the same as that in Example 2, and the details will not be described here

TABLE 2

|  | Example 2 | Comparative Example 2 | difference |
| --- | --- | --- | --- |
| result of infrared-induced temperature-rising test (T value) | 46.1° C. | 43.5° C. | 2.6° C. |
| infrared absorption (A value) | 59% | 50% | 9% |

The experimental results of Example 2 and Comparative Example 2 are shown in Table 2. In Table 2, if the A value is higher, it indicates that the composite textile has a better ability to absorb light energy. Furthermore, if the T value is higher, it indicates that the composite textile has a better ability to release thermal energy. As shown in Table 2, for both the ability to absorb light energy and the ability to release thermal energy, Example 2 was better than Comparative Example 2. In other words, in contrast to the undoped zinc oxide, aluminum-doped zinc oxide has a better ability to absorb light energy and a better ability to release thermal energy.

Example 3

200 g of GZO (weight ratio: Ga/Zn=5.0/100.0), 20 g of PVP (Mw=58,000), and 800 g of DMAc were mixed and stirred uniformly to form a colloid mixture. The measured median particle diameter D50 of the colloid was 127.6 nm. The colloid mixture was coated on a Nylon fiber cloth by gravure printing and dried to obtain a composite textile. The GZO nanocomposite powder was measured to be 1.5 parts by weight with respect to 100 parts by weight of the textile substrate. Then, the infrared-induced temperature-rising test as specified in TN-037 and the above-mentioned infrared absorption test were conducted on the composite textile.

Comparative Example 3

The infrared-induced temperature-rising test as specified in TN-037 and the above-mentioned infrared absorption test were conducted on a Nylon fiber cloth.

TABLE 3

|  | Example 3 | Comparative Example 3 | difference |
| --- | --- | --- | --- |
| result of infrared-induced temperature-rising test (T value) | 49.3° C. | 43.0° C. | 6.3° C. |
| infrared absorption (A value) | 66% | 51% | 15% |

The experimental results of Example 3 and Comparative Example 3 are shown in Table 3. As shown in Table 3, for both the ability to absorb light energy and the ability to release thermal energy, Example 3 was better than Comparative Example 3. In other words, in contrast to the textile which does not include the nanocomposite powder, the composite textile including the nanocomposite powder has a better ability to absorb light energy and a better ability to release thermal energy.

Example 4

200 g of GZO (weight ratio: Ga/Zn=5.0/100.0), 20 g of PVP (Mw=58,000), and 800 g of DMAc were mixed and stirred uniformly to form a colloid mixture. The measured median particle diameter D50 of the colloid was 127.6 nm. The colloid mixture was added into polyurethane (PU), and then was coated on a Nylon fiber cloth by gravure printing and dried to obtain a composite textile. The GZO nanocomposite powder was measured to be 1.5 parts by weight with respect to 100 parts by weight of the textile substrate. Then, the infrared-induced temperature-rising test as specified in TN-037 and the above-mentioned infrared absorption test were conducted on the composite textile.

TABLE 4

|  | Example 4 | Comparative Example 3 | difference |
| --- | --- | --- | --- |
| result of infrared-induced temperature-rising test (T value) | 49.5° C. | 43.0° C. | 6.5° C. |
| infrared absorption (A value) | 65% | 51% | 14% |

The experimental results of Example 4 and Comparative Example 3 are shown in Table 4. As shown in Table 4, for both the ability to absorb light energy and the ability to release thermal energy, Example 4 was better than Comparative Example 3. In other words, in contrast to the textile which does not include the nanocomposite powder, the composite textile including both the polymer carrier (i.e., PU) and the nanocomposite powder has a better ability to absorb light energy and a better ability to release thermal energy.

Example 5

100 g of GZO (weight ratio: Ga/Zn=1.5/100.0), 5 g of PVP (Mw=1,280,000), and 400 g of DMAc were mixed and stirred uniformly to form a colloid mixture. The measured median particle diameter D50 of the colloid was 62.0 nm. The colloid mixture was added into polyacrylonitrile (PAN), and then was electrospun to form a non-woven fabric thin film. The resulting non-woven fabric thin film was attached to a Nylon fiber cloth to obtain a composite textile. The GZO nanocomposite powder was measured to be 1.0 part by weight with respect to 100 parts by weight of the textile substrate. Then, the infrared-induced temperature-rising test as specified in TN-037 and the above-mentioned infrared absorption test were conducted on the composite textile.

TABLE 5

|  | Example 5 | Comparative Example 3 | difference |
|---|---|---|---|
| result of infrared-induced temperature-rising test (T value) | 45.0° C. | 43.0° C. | 2.0° C. |
| infrared absorption (A value) | 58% | 5% | 7% |

The experimental results of Example 5 and Comparative Example 3 are shown in Table 5. In contrast to the textile which does not include the nanocomposite powder, the composite textile including both the polymer carrier (i.e., PAN) and the nanocomposite powder has a better ability to absorb light energy and a better ability to release thermal energy.

Example 6

100 g of GZO (weight ratio: Ga/Zn=1.5/100.0), 5 g of PVP (Mw=1,280,000), and 400 g of DMAc were mixed and stirred uniformly to form a colloid mixture. The measured median particle diameter D50 of the colloid was 62.0 nm. The colloid mixture was added into polyvinylidene fluoride (PVDF), and then was electrospun to form a non-woven fabric thin film. The resulting non-woven fabric thin film was attached to a Nylon fiber cloth to obtain a composite textile. The GZO nanocomposite powder was measured to be 1.0 part by weight with respect to 100 parts by weight of the textile substrate. Then, the infrared-induced temperature-rising test as specified in TN-037 and the above-mentioned infrared absorption test were conducted on the composite textile.

TABLE 6

|  | Example 6 | Comparative Example 3 | difference |
|---|---|---|---|
| result of infrared-induced temperature-rising test (T value) | 45.2° C. | 43.0° C. | 2.2° C. |
| infrared absorption (A value) | 59% | 51% | 8% |

The experimental results of Example 6 and Comparative Example 3 are shown in Table 6. In contrast to the textile which does not include the nanocomposite powder, the composite textile including both the polymer carrier (i.e., PVDF) and the nanocomposite powder has a better ability to absorb light energy and a better ability to release thermal energy.

Comparative Example 4

100 g of GZO (weight ratio: Ga/Zn=1.5/100.0), 5 g of PEI (Mw=1,800), and 400 g of DMAc were mixed and stirred uniformly to form a colloid mixture. The measured median particle diameter D50 of the colloid was 310.8 nm. The colloid mixture was added into PVDF, and then was electrospun. As a result, the colloid mixture including PVDF cannot be electrospun into a non-woven thin film.

From the results of Comparative Example 4, it can be realized that the colloid mixture using PEI cannot be electrospun into a non-woven thin film. By contrast, the colloid mixture using PVP (i.e., Example 6) can be electrospun into a non-woven thin film. Because there are more applicable methods for coating, the flexibility of the manufacturing processes can be improved. Furthermore, the diameter of the fiber prepared by the conventional spinning method may not less than 1 μm. By contrast, the electrospinning process not only reduces the fiber diameter to the nanometer scale, but also produces fibers with high specific surface area, high hygroscopicity, and high strength. In addition, the electrospinning process is simpler than the conventional spinning method, making it ideal for the production of macromolecular fibers or composite molecular fibers without the need to produce solid fibers from the liquid by chemical reactions or high temperatures. Otherwise, the electrospinning process can also be used to extract the fibers from the melting liquid, so that the resulting final product will not contain solvent. Furthermore, the electrospinning process also has the advantages of low cost, more spinnable material, and controllable process, and has become one of the main ways for efficiently manufacturing the nanofiber materials.

In conclusion, some embodiments in this disclosure provide a composite textile and its manufacturing method. The composite textile and its manufacturing method at least include the following advantages:

(1) The composite textile includes specific nanocomposite powder, and the nanocomposite powder can efficiently absorb the energy of light such as infrared rays, and it can release the absorbed energy in the form of thermal energy after absorbing the energy of light. Therefore, the thermal effect of the textile can be significantly improved without increasing the size or weight of the textile remarkably.

(2) The colloid mixture including the nanocomposite powder is directly coated on the textile substrate, and the composite textile 100 can be efficiently manufactured. Therefore, the time and cost of the production can be significantly reduced.

(3) The dried nanocomposite powder can be optionally stored for a long period of time (for example, from several days to several months). Therefore, the flexibility of the manufacturing processes can be significantly improved.

(4) The thermal material layer further includes the polymer carrier, and the adhesion between the nanocomposite powder and the textile substrate can be further enhanced. Therefore, the problem of peeling of the nanocomposite powder can be improved or avoided.

(5) The thermal material layer is a highly transparent thin film. Therefore, the color of the composite textile can be the same as or similar to the color of the textile substrate.

Although the disclosure has been described by way of example and in terms of the preferred embodiments, it should be understood that various modifications and similar arrangements can be made herein without departing from the spirit and scope of the disclosure as defined by the appended claims.

What is claimed is:

1. A composite textile, comprising:
    a textile substrate; and
    a thermal material layer formed on the textile substrate, wherein the thermal material layer comprises a nanocomposite powder, and the nanocomposite powder consists of:
    a pyrrolidone-containing polymer, wherein the pyrrolidone-containing polymer is a derivative of polyvinylpyrrolidone or a combination of the derivative of polyvinylpyrrolidone and a polyvinylpyrrolidone, wherein the derivative of polyvinylpyrrolidone comprises a polyvinylpyrrolidone having an isocyanate group at a terminal, a polyvinylpyrrolidone having a methoxy group at a terminal, a polyvinylpyrrolidone having an ethoxy group at a terminal, a polyvinylpyrrolidone having a carboxylic acid group at a terminal, or a combination thereof; and an inorganic particle, wherein the inorganic particle is a metal oxide composed of a first metal $M^A$, a doping metal $M^B$ and oxygen;

wherein the inorganic particle makes up 62.5-99.9 wt. % of the nanocomposite powder.

2. The composite textile as claimed in claim 1, wherein the metal oxide is represented by formula (I):

$$(M^A)(M^B)O \qquad (I)$$

wherein the first metal $M^A$ is zinc, indium, or tin; and the doping metal $M^B$ is tin, aluminum, gallium, iron, or antimony.

3. The composite textile as claimed in claim 2, wherein a content of the doping metal $M^B$ is 0.1-20 parts by weight, based on 100 parts by weight of the first metal $M^A$ in the inorganic particle.

4. The composite textile as claimed in claim 1, wherein a median particle diameter D50 of the nanocomposite powder is 30-600 nm.

5. The composite textile as claimed in claim 1, wherein a weight average molecular weight of the pyrrolidone-containing polymer is 3,000-1,500,000.

6. The composite textile as claimed in claim 1, wherein the thermal material layer further comprises a polymer carrier.

7. The composite textile as claimed in claim 6, wherein the polymer carrier comprises a polyurethane, a polyacrylonitrile, a polyvinylidene fluoride, a polyacrylate, a polypropylene, a polyamide, a polyester, a thermoplastic polyester elastomer, or a combination thereof.

8. The composite textile as claimed in claim 6, wherein the polymer carrier is 0.1-60 parts by weight, based on 100 parts by weight of the nanocomposite powder in the thermal material layer.

9. The composite textile as claimed in claim 1, wherein the nanocomposite powder is 0.0001-600 parts by weight, based on 100 parts by weight of the textile substrate.

10. The composite textile as claimed in claim 1, wherein the thermal material layer is a thin film.

11. The composite textile as claimed in claim 10, wherein a thickness of the thin film is 1-100 μm.

12. The composite textile as claimed in claim 10, wherein a light transmittance of the thin film is 70-83% under conditions in which a wavelength is in the range of 400-700 nm and a thickness of the thin film is 6 μm.

13. The composite textile as claimed in claim 10, wherein a light absorption of the thin film is 70-83% under conditions in which a wavelength is in the range of 1,000-2,500 nm and a thickness of the thin film is 6 μm.

14. The composite textile as claimed in claim 1, wherein the textile substrate comprises a polyethylene fiber textile, a polypropylene fiber textile, a polyamide fiber textile, a polyester fiber textile, a cellulose fiber textile, an acetate fiber textile, an animal fiber textile, or a combination thereof.

* * * * *